(12) United States Patent
Berry et al.

(10) Patent No.: US 11,813,934 B2
(45) Date of Patent: Nov. 14, 2023

(54) BATTERY PROTECTION IN AN ELECTRIC VEHICLE

(71) Applicant: Ford Global Technologies, LLC, Dearborn, MI (US)

(72) Inventors: Daniel Berry, Dearborn, MI (US); Heiko Landsmann, Cologne (DE); Christopher Holland, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 17/148,505

(22) Filed: Jan. 13, 2021

(65) Prior Publication Data

US 2022/0219521 A1    Jul. 14, 2022

(51) Int. Cl.
*B60K 1/04* (2019.01)
*B62D 25/20* (2006.01)

(52) U.S. Cl.
CPC ............ *B60K 1/04* (2013.01); *B62D 25/2072* (2013.01); *B60K 2001/0438* (2013.01)

(58) Field of Classification Search
CPC .............. B60K 1/04; B60K 2001/0438; B62D 25/2072; B60Y 2306/01
See application file for complete search history.

(56) References Cited

U.S. PATENT DOCUMENTS

| 8,839,901 B1* | 9/2014 | Bradshaw | B62D 25/2072 |
| | | | 180/346 |
| 9,937,781 B1* | 4/2018 | Bryer | B62D 35/02 |
| 10,836,442 B1* | 11/2020 | Grattan | B62D 25/2072 |
| 2020/0406734 A1* | 12/2020 | Choi | B60K 1/04 |
| 2020/0406973 A1* | 12/2020 | Nagaya | B60K 1/04 |
| 2021/0245595 A1* | 8/2021 | Grace | H01M 50/20 |

FOREIGN PATENT DOCUMENTS

| CN | 208036415 U | 11/2018 |
| CN | 110282019 A | 9/2019 |
| CN | 210235101 U | 4/2020 |
| CN | 210257974 U | 4/2020 |

* cited by examiner

*Primary Examiner* — Paul N Dickson
*Assistant Examiner* — Shams Dhanani
(74) *Attorney, Agent, or Firm* — Todd W. Dishman; Carlson, Gaskey & Olds, P.C.

(57) ABSTRACT

The present disclosure is directed to a slider bar to protect a battery pack of a vehicle. The battery pack is housed on an underbody in between the vehicle's front and rear axles. The battery pack protrudes towards the ground. The battery pack can optionally be covered by a shield that has a slot through which the slider bar extends outwards towards the ground. The slider bar is coupled to the underbody near the battery pack. The slider bar is positioned lower than the battery pack such that in an event of the vehicle bottoming out, the impact will be absorbed by the slider bar instead of the battery pack. Thereby, the slider bar protects the battery pack from scraping/scratching the ground.

19 Claims, 7 Drawing Sheets

BATTERY PROTECTION IN AN ELECTRIC VEHICLE

BACKGROUND

Technical Field

The present disclosure relates to a slider bar for a battery pack of an electric vehicle.

Description of the Related Art

Battery packs may be mounted on an underside of an electric vehicle underbody positioned near a front axle. The battery pack protrudes towards the ground, which can impact an amount of ground clearance. Uneven roadways may interact with an exterior surface of the battery pack in some configurations and situations.

BRIEF SUMMARY

The present disclosure is directed to a slider bar assembly that separates a battery pack of a vehicle from the ground. The design and placement of the slider bar enables the slider bar to absorb ground impacts and minimizes the effect of the ground impact on the battery pack. The slider bar can be incorporated in electric vehicles having a longer wheelbase, such as trucks, sport utility vehicles, and crossover utility vehicles. The longer wheelbases may result in an exteriormost surface of the battery pack being closer to the ground. To maintain performance, the slider bar is positioned to separate the battery pack from a bulge or obstacle on a road surface or on a steep driveway or ramp.

The battery pack is positioned beneath an underbody in between a front axle and a rear axle. The battery pack extends from the underbody towards the ground. The slider bar is coupled to the underbody and extends further than the battery pack towards the ground. The slider bar will absorb ground impacts and keep the battery pack spaced from the ground.

The vehicle may include a shield or a battery pack cover that couples with the underbody and covers the battery pack. The shield includes a slot through which the slider bar extends past the battery pack. The slider bar is coupled with the underbody and the shield.

The slider bar is coupled to the underbody using a first end and a second end of the slider bar. The first end and the second end are each coupled to the underbody at least 30 cm away from both the front axle and the rear axle. The slider bar further includes an intermediate portion between the first end and the second end. The intermediate portion is a non-linear shape that curves or bends around a side of the battery pack.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
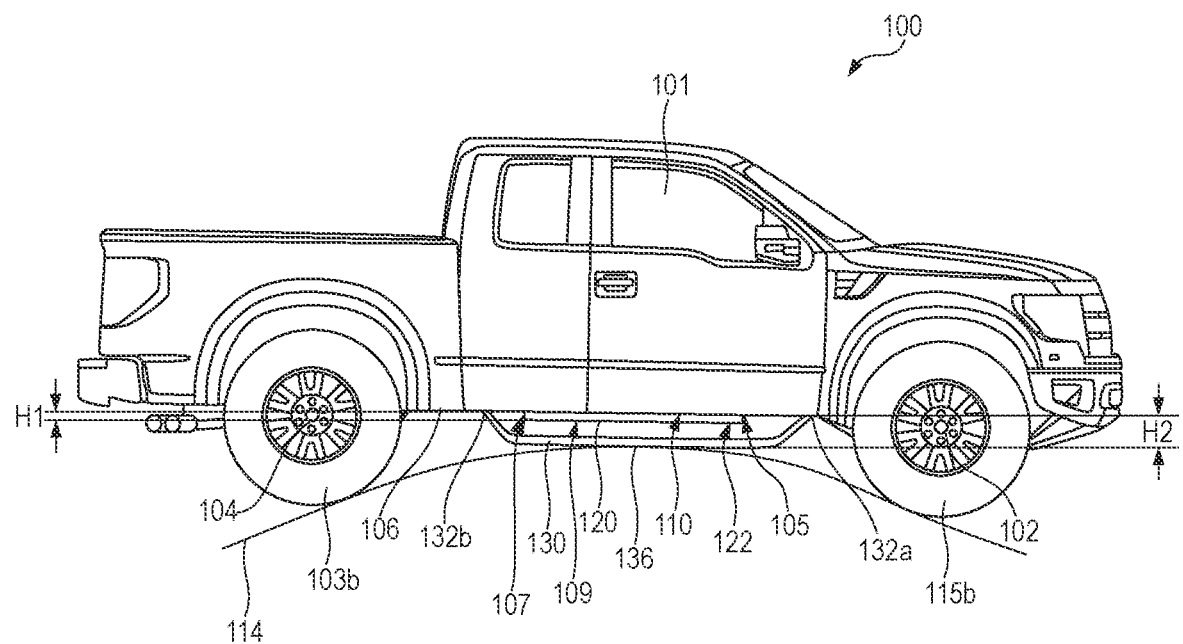
FIG. 1A is a side view of a vehicle with a battery pack and a slider bar, according to an embodiment of the present disclosure.
Figure 1B:
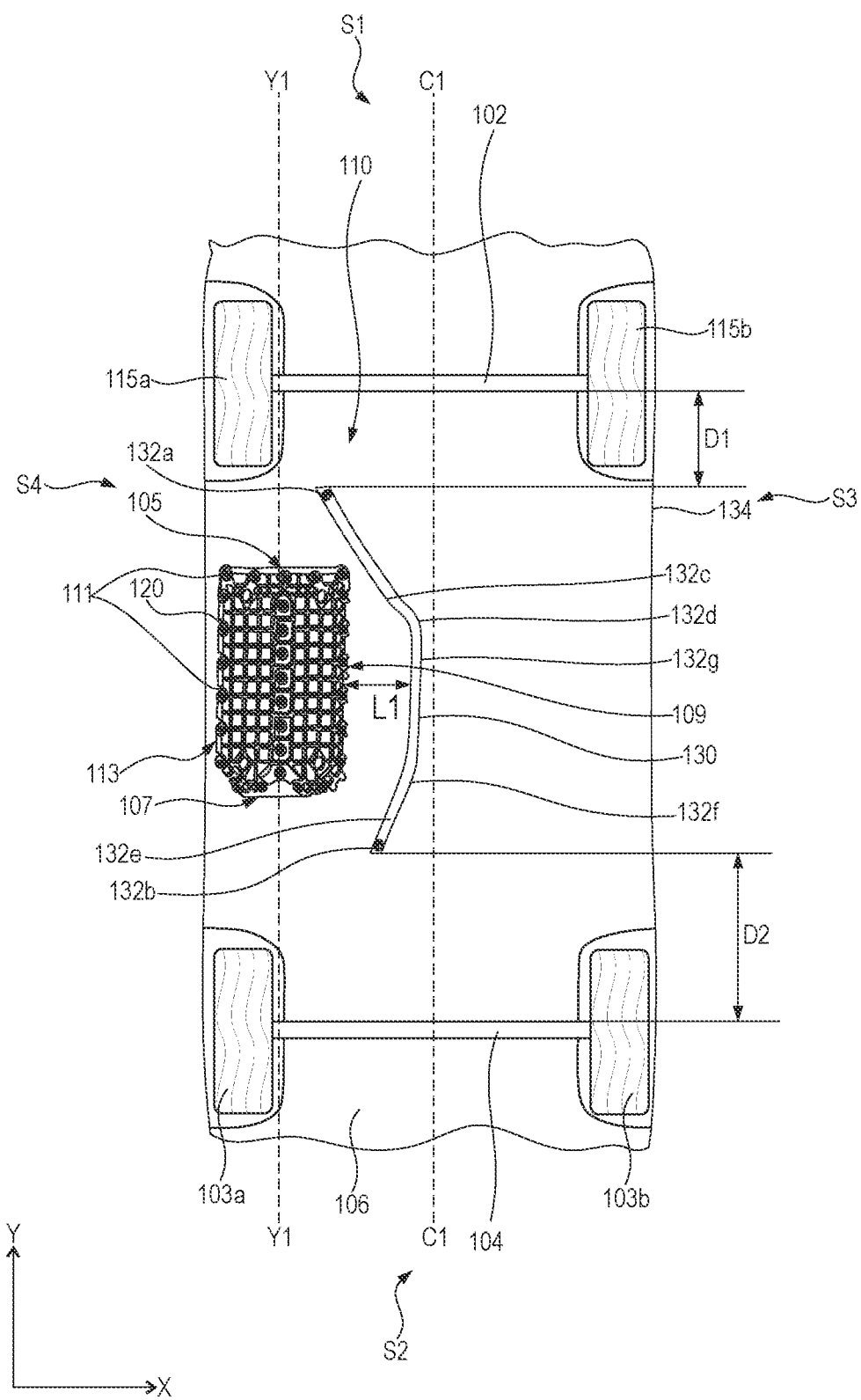
FIG. 1B is a simplified bottom view of an underbody with the battery pack and the slider bar of FIG. 1A.

FIGS. 1A and 1B are views of a vehicle 100 with a slider bar 130 and a battery pack 120, according to one embodiment. FIG. 1A is a side view of the vehicle 100 and FIG. 1B is a simplified view of an underside or an underbody 106 of the vehicle 100.

The vehicle 100 may be an electric vehicle, a hybrid vehicle, a plug-in hybrid electric vehicle, or a battery electric vehicle. The battery pack 120 is positioned between a front axle 102 and a rear axle 104. A set of rear tires 103a, 103b are coupled to the rear axle 104 and a set of front tires 115a, 115b are coupled to the front axle 102. The battery or the battery pack 120 is affixed to the underside 106 of the body, which may correspond to a position of a passenger compartment 101. The battery pack 120 includes a front edge 105 and a rear edge 107. The slider bar 130 includes a first end 132a closer to the front axle 102 and a second end 132b that is closer to the rear axle 104. The front edge 105 of the battery pack 120 is closer to the first end 132a of the slider bar 130, and the rear edge 107 is closer to the second end 132b. The battery pack 120 may be positioned equidistant from the front axle 102 and the rear axle 104 or may be positioned closer to the front axle 102 than the rear axle 104.

The underside or the underbody 106 provides a surface area and mechanical support for housing various components of the vehicle 100 such as electric motors, transmission, and suspension parts and supports an interior floor of the passenger compartment 101, among other things. The underbody 106 includes a lower surface 110 that faces towards ground or roadway 112. The battery pack 120 is coupled to the lower surface 110 of the underbody 106 that could include a recess for the battery pack 120 to be coupled within. Fasteners, adhesives, and other coupling techniques attach the battery pack 120 to the lower surface 110 of the underbody 106. In one example, the underbody 106 includes holes or retaining openings that can receive fasteners to secure the battery pack 120 with flanges or extensions that include corresponding openings, see openings 111.

As the battery pack 120 occupies space and is mounted under the underbody 106, the battery pack 120 protrudes or otherwise extends below the underbody 106 towards the ground 112 and in a direction away from the underbody 106. In FIG. 1A, the battery pack 120 has a height H1, which corresponds to a distance between a bottom surface 122 of the battery pack 120 and the lower surface 110 of the underbody 106. The height H1 and dimensions of the battery pack 120 may vary depending on the type of batteries used to assemble the battery pack 120.

The battery pack 120 provides power to various devices, including electric motors and other electrical components of the vehicle 100. The battery pack 120 may include a set of batteries or individual battery cells configured in a series, a parallel or a hybrid combination, to deliver a voltage, capacity, or power density. The number of batteries and the number of individual battery cells used in the battery pack 120 may vary depending upon the type of vehicle 100.

The ground clearance of the vehicle 100 is a distance between the bottom surface 122 of the battery pack 120 and the ground 112. As a wheelbase of the vehicle 100 is increased, a ramp break over (RBO) angle is decreased. The RBO angle is an arc 114 between the front tires 115a, 115b and the rear tires 103a, 103b and lowest surface of components under the vehicle 100. The RBO is dependent on the wheelbase, suspension height, tire size, and other floor body components of the vehicle 100. The RBO angle identifies when the vehicle 100 will interact with the ground 112 when over steep driveway ramps, parking structure ramps, irregular and uneven roads, and off-road features, for example.

The slider bar 130 is coupled to the underbody 106, in a proximity of the battery pack 120 to adjust the ground clearance of the vehicle 100. The first end 132a and the second end 132b form proximal and distal ends of the slider bar 130, respectively. The slider bar 130 includes a first portion 132c that extends from the first end 132a to a first curved portion 132d. The slider bar 130 further includes a second portion 132e that extends from the second end 132b to a second curved portion 132f. An intermediate portion 132g extends from the first curved portion 132d to the second curved portion 132f. The first portion 132c is at a first angle with respect to a central axis Y1-Y1 of the battery pack 120 that corresponds to a Y-axis. The first angle is, for example, in the range of 35 and 50 degrees. The second portion 132e is at a second angle with respect to the central axis Y1-Y1 of the battery pack 120. The second angle is smaller than the first angle. The second angle may be in the range of 20 and 30 degrees.

The first end 132a is coupled to the underbody 106 at a distance D1 from the front axle 102. The second end 132b is coupled to the underbody 106 at a distance D2 from the rear axle 104. The distances D1 and D2 generally vary between 30 to 50 centimeters (cm). The distance D1 is greater than the distance D2. The distances D1 and D2 will vary depending on the type of the vehicle 100 (pickup, hatchback, sedan). Further, the slider bar 130 may be coupled to the underbody 106 using bolts, welding, fasteners, or any other suitable techniques.

The first end 132a is closer to the central axis Y1-Y1 of the battery pack 120 than the second end 132b of the slider bar 130. The first end 132a is closer to the central axis Y1-Y1 of the battery pack 120 than an edge 109 of the battery pack 120. The edge 109 is closer to a centerline C1-C1 of the vehicle 100 and is opposite to another edge 113 that is along a passenger side S4 of the vehicle 100. The second end 132b is further from the central axis Y1-Y1 of the battery pack 120 than the edge 109. The intermediate portion 132g is the furthest feature of the slider bar 130 from the central axis Y1-Y1 of the battery pack 120.

In this embodiment, the battery pack 120 is positioned closer to the passenger side S4 than a driver's side S3. The slider bar 130 is positioned between the battery pack 120 and the centerline C1-C1 of the vehicle 100. In some embodiments, the slider bar 130 may have the first and second ends 132a, b coupled to the passenger side S4 of the centerline C1-C1 of the vehicle 100, while at least part of the intermediate portion 132g crosses or overlaps the centerline C1-C1 of the vehicle 100.

The first end 132a and the second end 132b help in offsetting the slider bar 130 laterally from the battery pack 120 by a distance L1. The offset distance is of a few centimeters (5-10 cm, for example). The slider bar 130 is offset away from the battery pack 120 towards a lateral edge 134 of the underbody 106. As in FIG. 1B, the slider bar 130 does not overlap the battery pack 120 when looking from a bottom view.

The slider bar 130 protrudes and extends outward below the underbody 106 towards the ground 112 and with a bottom surface 136 between the ground 112 and the battery pack 120. This positioning allows a safe distance from the ground 112 to minimize damage to the battery 120. The bottom surface 136 of the slider bar 130 is at a distance H2 from the lower surface 110 of the underbody 106. In all embodiments of the present disclosure, the distance H2 is greater than the height H1. In an example, the distance H2 is 5 mm to 10 mm more than the height H1, which means, if the height H1 is 10 millimeters (mm), the distance H2 is 15 mm to 20 mm.

The arrangement of the battery pack 120 and the slider bar 130 positions the slider bar 130 to impact the ground 112 to protect the battery pack 120 in the event the vehicle 100 bottoms out. Accordingly, the slider bar 130 protects the battery pack 120 from, for example, scratches, and impacts with the ground 112. During the impacts, deflection of the slider bar 130 is controlled by its design (offsetting of the slider bar 130) such that the slider bar 130 does not make contact with the battery pack 120, even during maximum deflection. In order to ensure that the slider bar 130 has sufficient strength and a long service life, the slider bar 130 may be composed of materials such as high-strength steel, titanium, composites, aluminum, and/or combinations thereof.

The slider bar 130 is made hollow to reduce weight and be cost-effective, but in some examples, the slider bar 130 may be solid. The cross section of the slider bar 130 may be circular, rectangular, triangular, oval, square, or of any other suitable shape.

Figure 2:
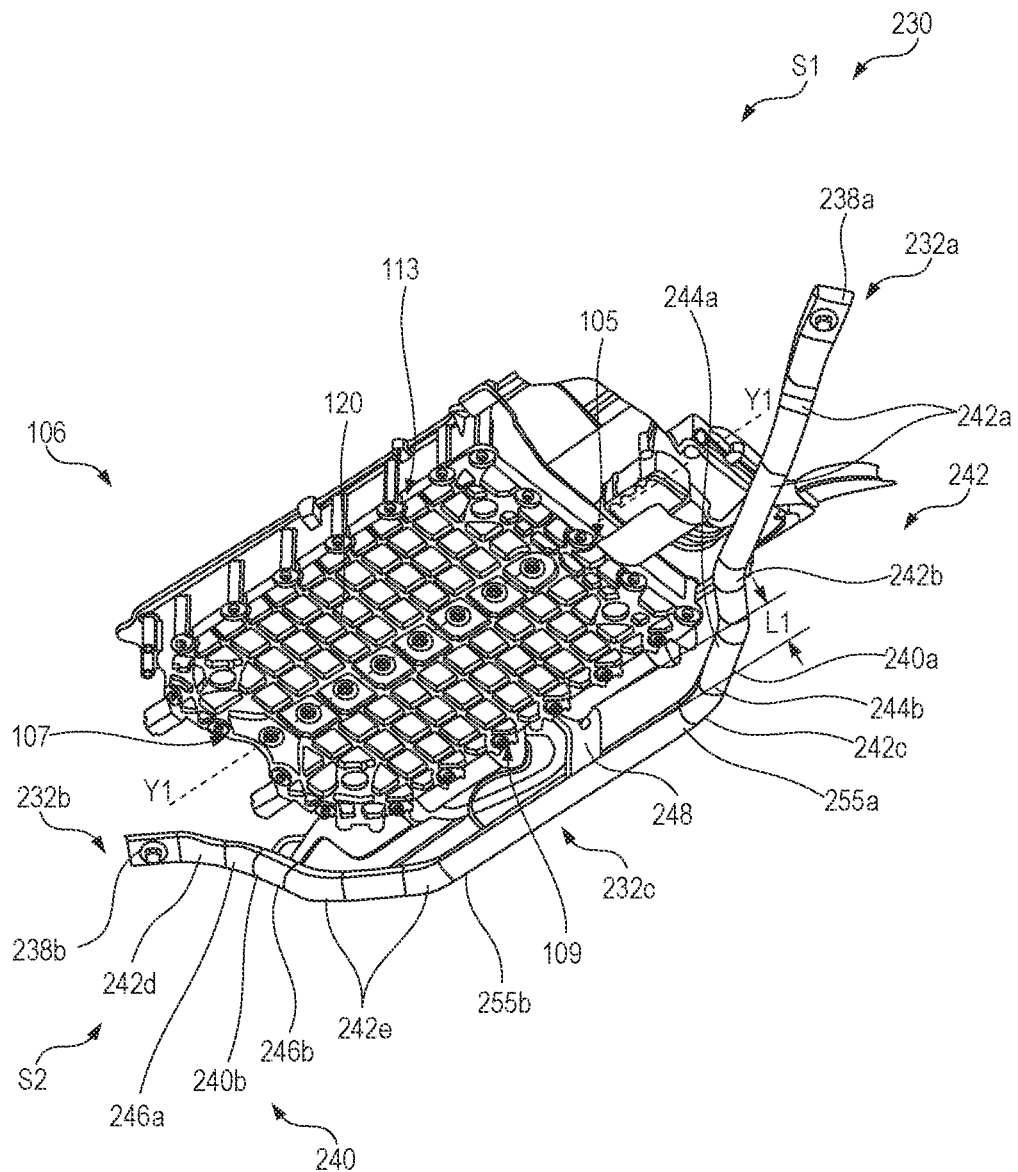
FIG. 2 is a slider bar adjacent to a battery, according to an embodiment of the present disclosure.

FIG. 2 is an alternative embodiment of a slider bar 230 arranged on the underside 106 of the vehicle 100 adjacent to the battery pack 120, according to an embodiment of the present disclosure. The slider bar 230 includes a first end 232a, a second end 232b, and an intermediate portion 232c. The first end 232a and the second end 232b form proximal and distal ends of the slider bar 230, respectively. The first end 232a is closer to the front edge 105 and the second end 232b is closer to the rear edge 107 of the battery pack 120. The first end 232a is coupled to the underbody 106 and positioned between the front axle 102 of the vehicle 100, illustrated in FIG. 1B, and the front edge 105 of the battery pack 120. The second end 232b is coupled to the underbody 106 and positioned between the rear axle 104 of the vehicle 100, illustrated in FIG. 1B, and the rear edge 107 of the battery pack 120.

The slider bar 230 is an irregularly shaped beam that includes various straight members 240 and angled members 242 specifically selected to conform to a shape of the battery pack 120 and the associated vehicle 100. The various combinations of the straight members 240 and the angled members 242 are selected based on various factors such as vehicle design, desired strength of the slider bar 230, and sizing of the battery pack 120.

The first end 232a of the slider bar 230 includes a first straight member 240a and three angled or angular members, i.e., 242a, 242b, and 242c. Similarly, the second end 232b of the slider bar 230 includes a second straight member 240b and two angled or angular members, i.e., 242d and 242e.

The first angular member 242a elevates the first end 232a from the underbody 106 to a first angle, with respect to the central axis Y1-Y1 of the battery pack 120 and connects with the second angular member 242b. The first angle, for example, is in the range of 35 and 50 degrees. The second angular member 242b connects with a proximal end 244a of the first straight member 240a. The angular member 242c connects a distal end 244b (opposite to the proximal end 244a) of the first straight member 240a to a first portion 255a of the intermediate portion 232c. The first straight member 240a and the angular member 242c extend in a tilted or an angled manner along a straight line to achieve a vertical height up to the first portion 255a of the intermediate portion 232c. The angular member 242c is coupled to the first portion 255a of the intermediate portion 232c and is substantially parallel to the underbody 106.

Similarly, the third angular member 242d elevates the second end 232b from the underbody 106 to a second angle with respect to the central axis Y1-Y1 of the battery pack 120 that may be different from the first angle. The second angle, for example, is in the range of 35 and 50 degrees. In an implementation, the second angle is smaller than the first angle. In another implementation, the first and second angles are equal, that is the first and second ends 232a and 232b are structurally similar.

The angular member 242d connects with a proximal end 246a of the second straight member 240b. The angular member 242e connects a distal end 246b (opposite to the proximal end 246a) of the second straight member 240b to a second portion 255b of the intermediate portion 232c. The second straight member 240b and the angular member 242e extends in a tilted or an angled manner along a straight line to achieve the height up to the second portion 255b of the intermediate portion 232c. The angular member 242e is coupled to the second portion 255b of the intermediate portion 232c and is substantially parallel to the underbody 106.

The first and second ends 232a and 232b integrally join to the intermediate portion 232c. The intermediate portion 232c is a straight solid bar and runs parallel to the underbody 106. The design and arrangement of the straight members 240 and the angled members 242, as described in the paragraphs above, help in offsetting the intermediate portion 232c laterally from the battery pack 120 by the distance L1.

The intermediate portion 232c is offset laterally by the distance L1 from the battery pack 120 so that the intermediate portion 232c does not make contact with the battery pack 120 or high voltage (HV) wiring even under maximum deflection.

The first end 232a and the second end 232b are continuous structures with a constant cross-sectional area. The slider bar 230 has a substantially circular cross-sectional area. Alternatively, the first end 232a and the second end 232b may flatten out to flat bar structures 238a and 238b near the underbody 106. The flat bar structures 238a and 238b may improve the overall strength of couplings. The flat bar structure 238b may be coupled to the underbody 106 on one side of the central axis Y1-Y1 such that the structure 238b is closer to the edge 109 of the battery pack 120 compared to the edge 113. The flat bar structure 238a is coupled on another side of the central axis Y1-Y1 such that the structure 238a is closer to the edge 113 compared to the edge 109 of the battery pack 120.

The intermediate portion 232c includes a bracket 248 that is coupled to the intermediate portion 232c at one end and to the underbody 106 at another end. The slider bar 230 may include multiple brackets to couple with the underbody 106 and support the slider bar 230 to absorb any potential impacts.

The intermediate portion 232c protects the battery pack 120 and the HV wiring when the vehicle 100 bottoms out. The battery pack 120 is also prevented from being impacted when the vehicle 100 travels on an uneven road surface, thereby, improving service life of the battery pack 120.

The entirety of the slider bar 230 (the first end 232a, the second end 232b, and the intermediate portion 232c) is manufactured as a single unit via casting, forming, additive manufacturing, or by any other suitable process. Alternatively, the first end 232a, the second end 232b, and the intermediate portion 232c can be manufactured separately and be coupled using a suitable method like welding, for example. Also, the materials of the slider bar 230 may be composed of high-strength steel, titanium, composites, aluminum, and/or combinations thereof. The slider bar 230 may further include an abrasive coating of rubber or an anti-rust material. This may increase the service life of the slider bar 230 and improves its corrosion resistance.

Figure 3:
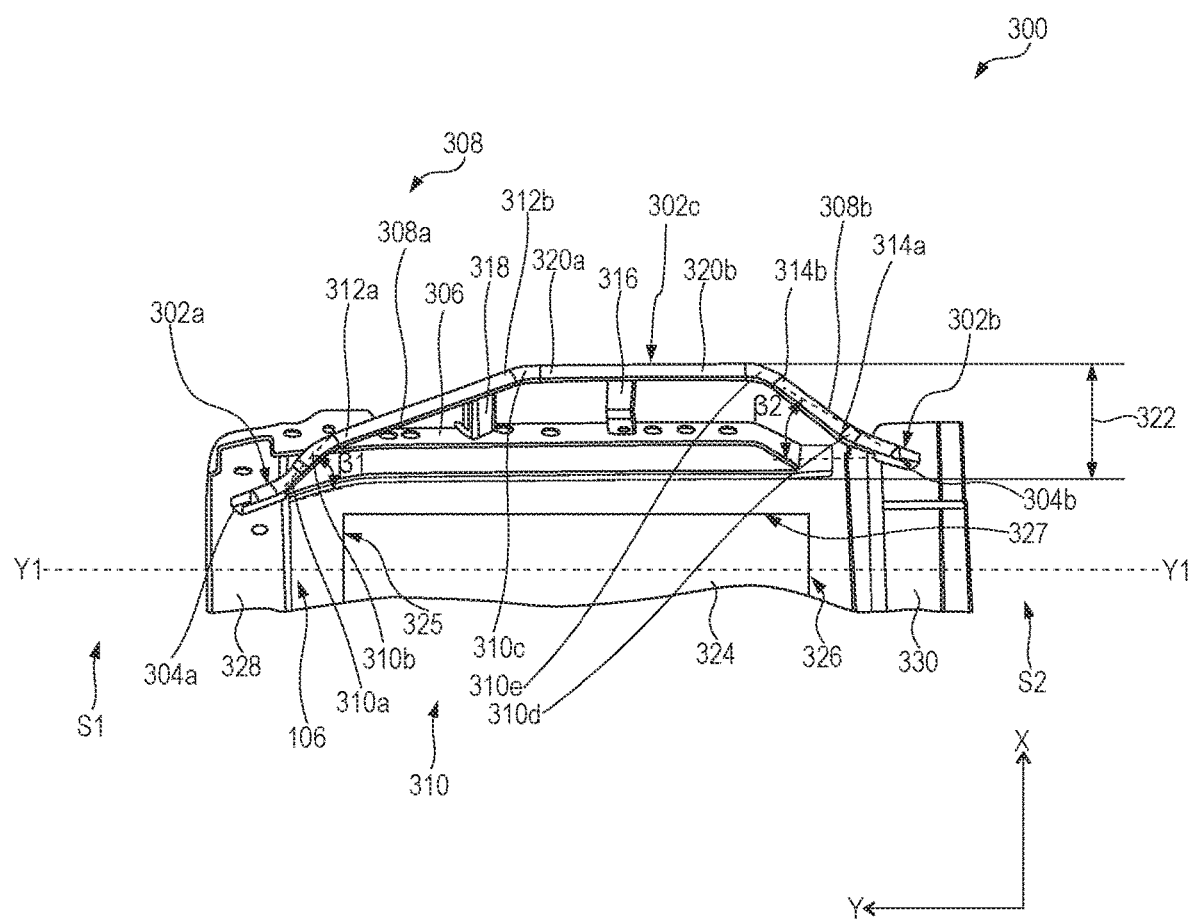
FIG. 3 is a bottom perspective view of a slider bar, according to an embodiment of the present disclosure.

FIG. 3 is a perspective view of an alternative embodiment of a slider bar 300 arranged on the underside 106 of the vehicle 100 adjacent to a battery pack 324, according to an embodiment of the present disclosure. FIG. 3 is a simplified perspective view that shows only an outline of the battery pack 324 for the purpose of beverity. The battery pack 324 includes an edge 325 and an edge 326 that is parallel to the edge 325. The edge 325 is closer to the front axle 102 compared to the rear axle 104 of the vehicle 100, and the edge 326 is closer to the rear axle 104 compared to the front axle 102 of the vehicle 100. The battery pack 324 includes an edge 327 and another edge (not shown) that is parallel to the edge 327. The edge 327 is closer to the slider bar 300 compared to the another edge.

The slider bar 300 includes a first end 302a, a second end 302b, and an intermediate portion 302c. The first end 302a and the second end 302b form proximal and distal ends of the slider bar 300, respectively. The first end 302a is closer to the front edge 325 and the second end 302b is closer to the rear edge 326 of the battery pack 324. The first end 302a is coupled to the underbody 106 and positioned between the front axle 102 of the vehicle 100 and the front edge 325 of the battery pack 324. The second end 302b is coupled to the underbody 106 and positioned between the rear axle 104 of the vehicle 100 and the rear edge 326 of the battery pack 324. The first end 302a and the second end 302b of the slider bar 300 are coupled on frame elements 328, 330, respectively.

The slider bar 300 is irregularly shaped and includes multiple straight members 308 and angled members 310 that allow the slider bar 300 to conform to a shape of the battery pack 324 and the associated vehicle 100. The combinations of the straight members 308 and the angled members 310 are selected based on various factors such as vehicle design, desired strength of the slider bar 300, and sizing of the battery pack 324.

The first end 302a of the slider bar 300 includes a first straight member 308a and three angled or angular members, i.e., 310a, 310b, and 310c. Similarly, the second end 302b of the slider bar 300 includes a second straight member 308b and two angled or angular members, i.e., 310d and 310e.

The angular member 310a elevates the first end 302a from the underbody 106 to a first angle β1 that may be in the range of 35 and 50 degrees, for example 45 degrees, with respect to a central axis Y1-Y1 of the battery pack 324 and connects with the angular member 310b. A proximal end 312a of the first straight member 308a connects with the angular member 310b. The angular member 310c connects a distal end 312b (opposite to the proximal end 312a) of the first straight member 308a to a first portion 320a of the intermediate portion 302c. The first straight member 308a and the angular member 310c extend in a tilted or an angled manner along a straight line to achieve a vertical height 322 up to the first portion 320a of the intermediate portion 302c. The angular member 310c is coupled to the first portion 320a of the intermediate portion 302c and is substantially parallel to the underbody 106.

Similarly, the angular member 310d elevates the second end 302b from the underbody 106 to a second angle β2 that may be in the range of 35 and 50 degrees, for example 30 degrees, with respect to the central axis Y1-Y1 of the battery pack 324. The angular member 310d connects with a proximal end 314a of the second straight member 308b. The angular member 310e connects a distal end 314b (opposite to the proximal end 314a) of the second straight member 308b to a second portion 320b of the intermediate portion 302c. The second straight member 308b and the angular member 310e extend in a tilted or an angled manner along a straight line to achieve the vertical height 322. The angular member 310e is coupled to the second portion 320b of the intermediate portion 302c and is substantially parallel to the underbody 106. In one embodiment, the first and the second acute angles β1 and β2 are the same, i.e., the first end 302a is structurally similar to the second end 302b.

The first and second ends 302a and 302b integrally join the intermediate portion 302c, which is a straight solid bar and runs parallel to the underbody 106. The intermediate portion 302c is laterally offset from the battery pack 324 so that the intermediate portion 302c does not make contact with the battery pack 324 or HV wiring even under maximum deflection.

A first support 304a, a second support 304b, and one or more frame elements 306 may be coupled to the underbody 106. The first end 302a of the slider bar 300 is coupled with the first support 304a and the second end 302b of the slider bar 300 is coupled with the second support 304b, opposite to the first support 304a. The first support 304a and the second support 304b are thin flattened strips that increase the mechanical strength of couplings. The first end 302a and the second end 302b are coupled to the first support 304a and the second support 304b, respectively. In one example, the first support 304a and the second support 304b are a part of the frame element 306 of the underbody 106. In one example, the frame element 306 is a sheet metal.

The first end 302a and the second end 302b of the slider bar 300 may be continuous structures with a constant cross-sectional area. The slider bar 300 has a substantially circular cross-sectional area. The first end 302a and the second end 302b may be coupled to the frame elements 328, 330 of the underbody 106 on only one side of the central axis Y1-Y1 of the battery pack 324 such that the first and second ends 302a,b are closer to the edge 327 compared to an opposing edge (not shown) of the battery pack 324.

The intermediate portion 302c includes a first bracket 316 and a second bracket 318. The first bracket 316 is coupled to the intermediate portion 302c at one end and to the frame element 306 at another end. The first and the second brackets 316, 318 are manufactured with the entire slider bar 300 as a single unit. Alternatively, the brackets 316 and 318 may be manufactured as separate components and attached to the slider bar 300 using suitable techniques. The slider bar 300 may include multiple brackets or a single bracket to couple with the underbody 106 and support the slider bar 300 to absorb any potential impacts.

The slider bar 300 may include materials and may be manufactured in ways that are similar to as discussed in FIG. 2.

Figure 4:
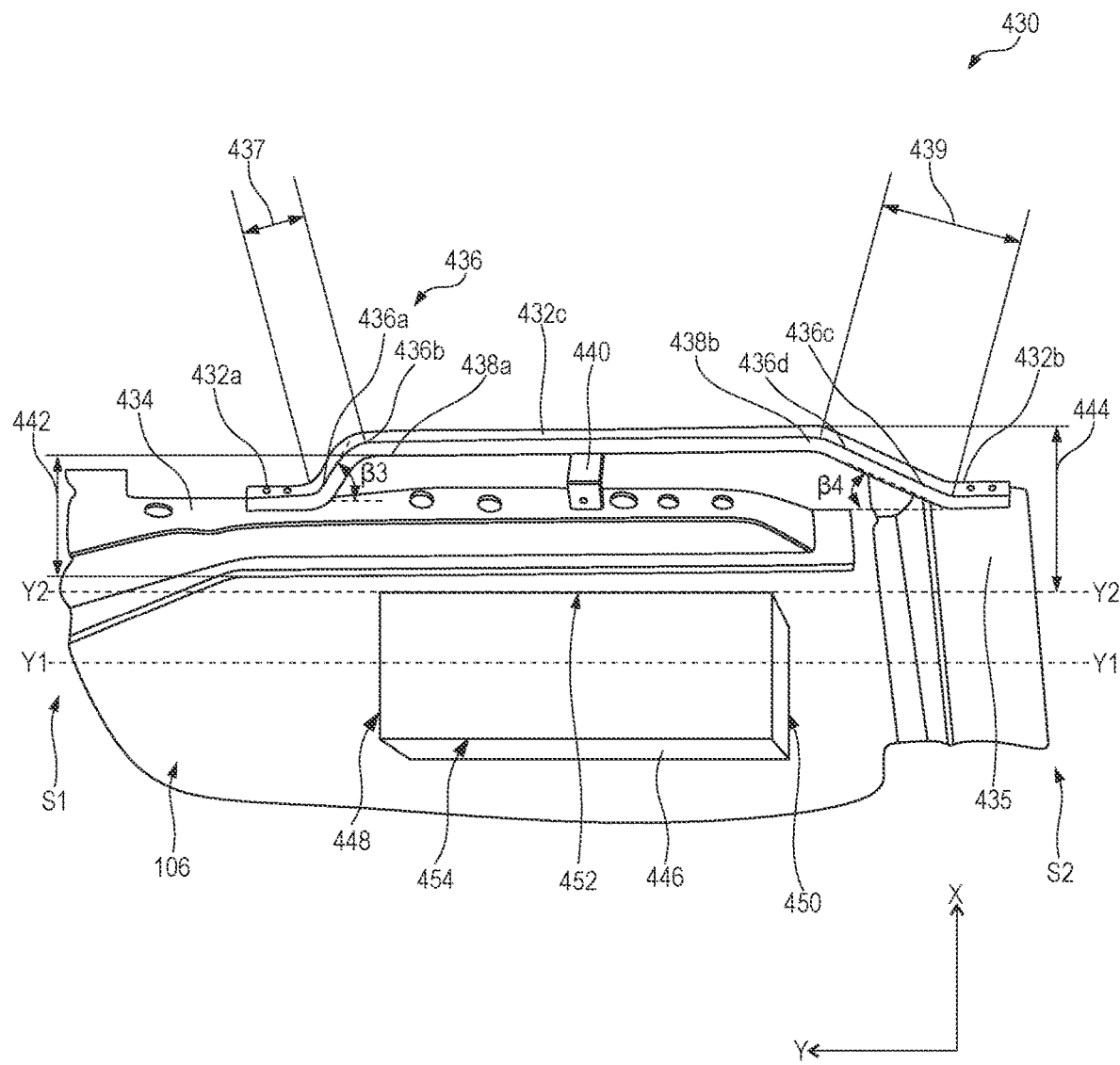
FIG. 4 is another example of a slider bar, according to an embodiment of the present disclosure.

FIG. 4 is an alternative embodiment of a slider bar 430 adjacent to a battery pack 446 according to the present disclosure. The slider bar 430 is a straight tubular structure having a substantially rectangular cross section.

The slider bar 430 includes a first end 432a, a second end 432b, and an intermediate portion 432c that is between the first and second ends 432a, b. The first end 432a and the second end 432b form proximal and distal ends of the slider bar 430, respectively. The battery pack 446 includes an edge 448 and an edge 450 that is parallel to the edge 448. The edge 448 is closer to the front axle 102 compared to the rear axle 104 and the edge 450 is closer to the rear axle 104 compared to the front axle 102. The battery pack 446 includes an edge 452 and an edge 454 that is parallel to the edge 452. The edge 452 is closer to the slider bar 430 compared to the edge 454. An edge axis line Y2-Y2 that runs from the front side S1 to the rear side S2 of the vehicle 100, corresponds to the edge 452 of the battery pack 446. The first end 432a, the second end 432b, and the intermediate portion 432c of the slider bar 430 are positioned further from a central axis Y1-Y1 of the battery pack 446 than the outermost edge 452 of the battery pack 446 and the edge axis line Y2-Y2. The first end 432a and the second end 432b of the slider bar 430 are coupled on frame elements 434, 435 that are coupled to the underbody 106 and add to a distance 444 to create sufficient separation from the battery pack 446.

The first end 432a and the second end 432b of the slider bar 430 are coupled at least 50 cm away from both the front and the rear axles, 102 and 104, respectively, illustrated in FIG. 1B. Additionally, the slider bar 430 is coupled such that the intermediate portion 432c is located at the distance 444 from the battery pack 446. The distance 444 is the lateral distance between the battery pack 446 and a battery-facing surface of the intermediate portion 432c.

The first end 432a and the second end 432b include angular members 436. The angular members 436 (also called angled members 436) can be altered according to design requirements such as desired strength of the slider bar 430 and sizing of battery pack 446.

The angled members 436 include a first angular member 436a and a second angular member 436b at the first end 432a. The first angular member 436a elevates the first end 432a from the underbody 106 to a third acute angle β3 (e.g., 50-65 degrees) with respect to the central axis Y1-Y1 of the battery pack 446, so that the first end 432a achieves a height 442. The first end 432a is flat and coupled to the frame element 434. The tube is bent at the first angular member 436a away from the underbody 106. The second angular member 436b is bent in a different direction than the first angular member 436a. The second angular member 436b is coupled to a first portion 438a of the intermediate portion 432c and is substantially parallel to the underbody 106.

Similar to the first end 432a, the angled members 436 include a third angular member 436c and a fourth angular member 436d that are closer to the second end 432b. The third angular member 436c elevates the second end 432b from the underbody 106 to a fourth acute angle β4 (e.g., 30-45 degrees) with respect to the central axis Y1-Y1 of the battery pack 446, so that the second end 432b achieves the height 442. The second end 432b is flat and coupled to the frame member 435. The first end 432a and the second end 432b, may be at a same distance from the central axis Y1-Y1 of the battery pack 446.

The third angular member 436c curves or bends away from the second end 432b and away from the underbody 106. The fourth angular member 436d bends in a different direction than the third angular member 436c. A second portion 438b of the intermediate portion 432c extends from the fourth angular member 436d and is substantially parallel to the underbody 106.

A distance 437 between the first and second angular members 436a and 436b is less than a distance 439 between the third and fourth angular members 436c and 436d. The third angle β3 is greater than the fourth angle β4. The first and second portions 438a and 438b, as explained above, integrally join to the intermediate portion 432c. The intermediate portion 432c is a straight solid bar and runs substantially parallel to the underbody 106. The intermediate portion 432c is laterally spaced apart from the edge 452 of the battery pack 446 by the distance 444. The distance 442 between the intermediate portion 432c and the battery pack 446 is configured to separate the battery pack 446 from the ground 112, illustrated in FIG. 1A, with the intermediate portion 432c even if there is deflection of the slider bar 430 upon impact with the ground 112 or an object.

The intermediate portion 432c is coupled to the underbody 106 with a bracket 440. The bracket 440 is between the first end 432a and the second end 432b and is spaced from the edge 452 by the distance 444. The bracket 440 may be coupled to the frame member 434 with a fastener or other coupling device.

The intermediate portion 432c of the slider bar 430 is closer to the ground 112 than the battery pack 446. In an event of the vehicle 100 bottoming out, the impact will be absorbed by the slider bar 430 and the battery pack 446 will be protected.

Figure 5A:
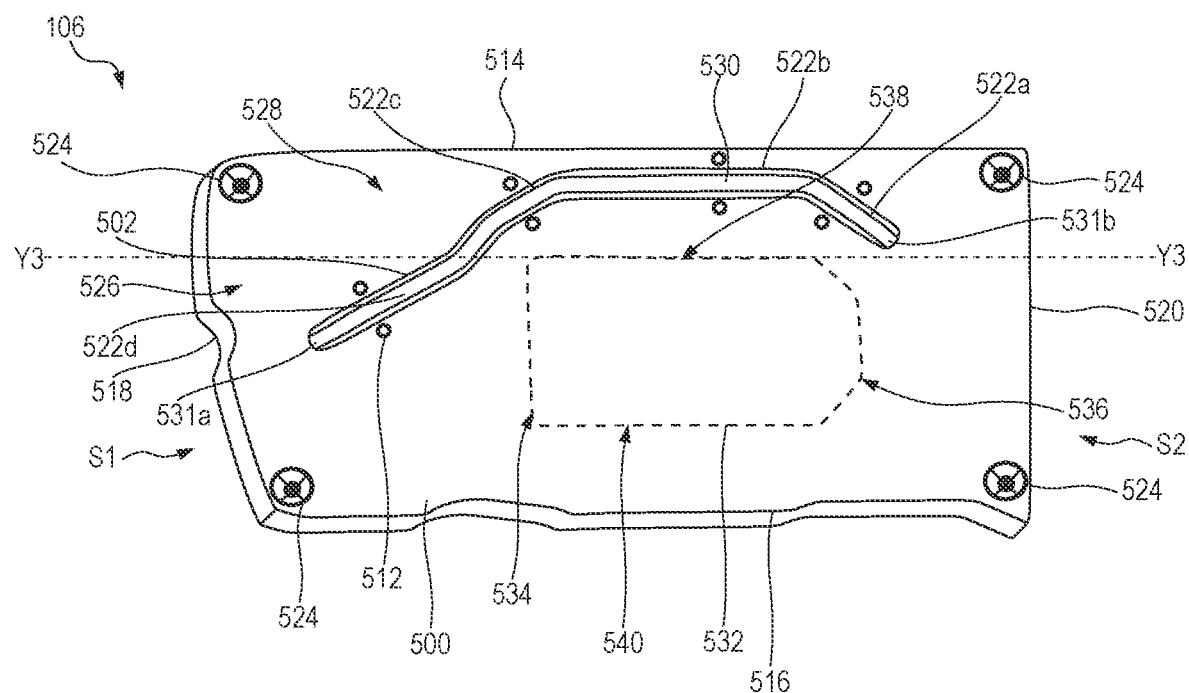
FIG. 5A is a shield or a battery cover covering a battery pack and a slider bar, according to an embodiment of the present disclosure.
Figure 5B:
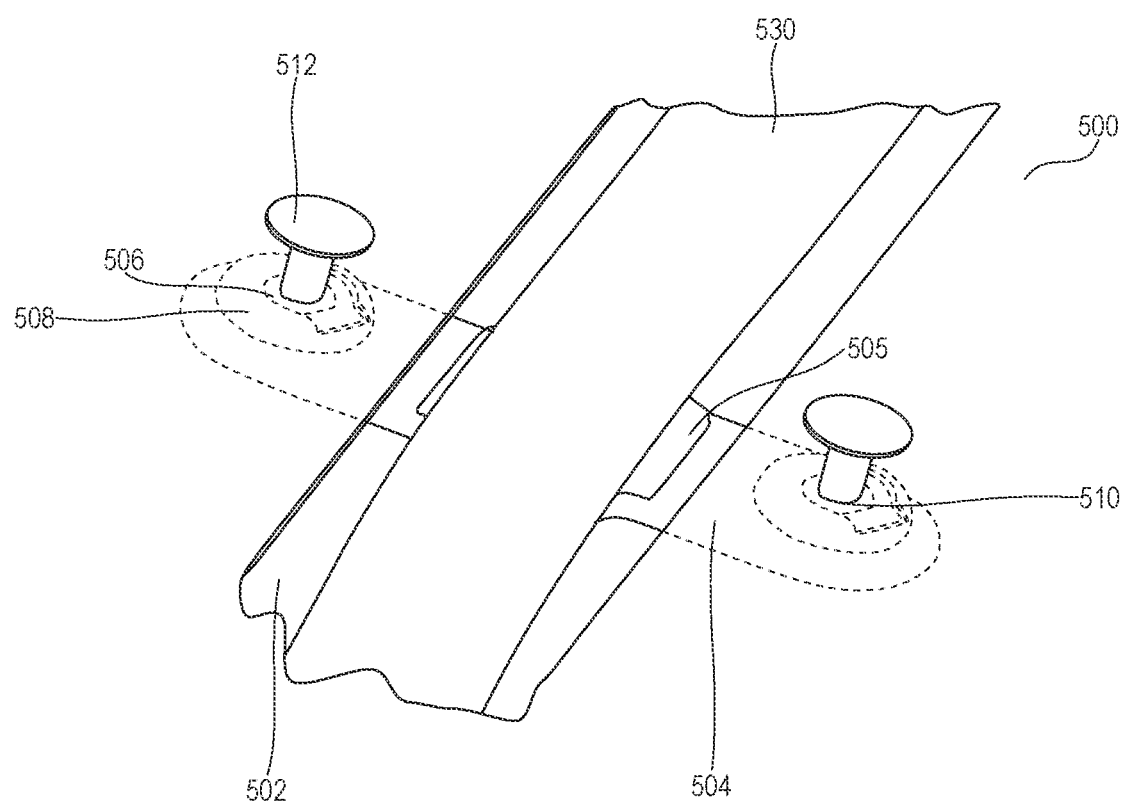
FIG. 5B is a coupling mechanism (tabs) to couple the slider bar with the shield of FIG. 5A.

FIGS. 5A and 5B illustrate a slider bar 530 protruding from a shield 500, according to one embodiment of the present disclosure. The slider bar 530 is a non-linear bar that is coupled to the underbody 106 of the vehicle 100 with ends that are covered by the shield 500. The shield 500 includes an opening or a slot 502 through which the bar 530 can extend by a distance. Only a surface of the bar 530 extends through the opening 502. The surface of the bar 530 is configured to interact with the ground 112, illustrated in FIG. 1A, separating a cover and a battery 532 from interacting with the ground 112. The battery pack 532 includes an edge 534 and an edge 536 that is parallel to the edge 534. The edge 534 is closer to the front axle 102 compared to the rear axle 104, illustrated in FIG. 1B, and the edge 536 is closer to the rear axle 104 compared to the front axle 102. The battery pack 532 includes an edge 538 and an edge 540 that is parallel to the edge 538. The edge 538 is closer to the slider bar 530 compared to the edge 540.

The shield 500 is a cover or other physical structure that encloses the battery pack 532 and other related components to keep road debris and dust away. The shield 500 may be plastic, a plurality of composites, carbon fiber, sheet metals, or other suitable materials. The shield 500 is coupled on the underbody 106 and covers the entire battery pack 532 and high voltage wiring, for example. The shield 500 is coupled on the underbody 106 using one or more fasteners 524.

The dimensions of the shield 500 may be varied to accommodate different sizes of vehicles, battery packs, or the slider bars. For example, if a longitudinal length of the battery pack 532 along the underbody 106 is increased or decreased, then, length of the shield 500 will be increased or decreased proportionally to that of the longitudinal length of the battery pack 532 so that the shield 500 always fully encloses the battery pack 532.

The shield 500 includes a driver side or a first side 514, a passenger side or a second side 516, a front-end side or a third side 518, and a rear-end side or a fourth side 520. The second side 516 includes one or more curvatures and is not parallel to the first side 514. Alternatively, the second side 516 can be parallel to the first side 514. Similarly, the third side 518 or the fourth side 520 may include curvatures and may not be parallel to each other. Alternatively, the third side 518 and the fourth side 520 can be parallel to each other.

The shield 500 includes the groove or the slot 502 shaped to accommodate the protruding slider bar 530. The dimensions of the slot 502 are slightly bigger than the slider bar 530 such that the slider bar 530 can easily extend through the slot 502. The slider bar 530 extends outwards towards the ground 112 through the slot.

The slot 502 includes sections 522a, 522b, 522c, and 522d that correspond to the shape and contour of the slider bar 530 that shall be positioned inside. An edge axis line Y3-Y3, that runs from the front side S1 to the rear side S2 of the vehicle 100, corresponds to the edge 538 of the battery 532. The edge axis line Y3-Y3 intersects the slot 502 to form a first section 526 and a second section 528 of the slot 502. The first section 526 includes a first end 531a of the slider bar 530, the section 522d, and a portion of the section 522c of the slot 502. The second section 528 includes a portion of the section 522c, the sections 522a, 522b of the slot 502, and a second end 531b of the slider bar 530. The first section 526 is located ahead of the edge 534 of the battery 532, towards the front axle 102. The second section 528 is located beside or adjacent to the edge 538 of the battery 532. The second section 528 is closer to the centerline C1-C1, illustrated in FIG. 1B, compared to the first section 526. The second section 528 extends between the front axle 102 and the rear axle 104, illustrated in FIG. 1B.

As shown in FIG. 5B, the slider bar 530 includes a plurality of tabs 504 installed on the surface to couple with the shield 500. The tabs 504 are sheet metal pieces and are attached to the slider bar 530 using any suitable technique, for example, welding. Optionally, the tabs 504 may be manufactured along with the slider bar 530 as a single unit. The tabs 504 are positioned perpendicularly on circumference of the slider bar 530 facing towards the battery pack 532. The tabs 504 are spaced apart on the slider bar 530 at appropriate distances to effectively support the slider bar 530 and shield 500 coupling. The tabs 504 may include secondary structures 505 for gripping the slider bar 530.

The tabs 504 include holes 506 and retainers 508, such as washers or countersinks, for example. The holes 506 and the retainers 508 align with holes 510 on the surface of the shield 500, located near the slot 502. A bolt or a pin 512 is used to traverse through the holes 506, 510 and the tabs 504, respectively. The pin 512 effectively secures the slider bar 530 and the shield 500.

As the shield 500 is coupled onto the battery pack 532, the ground clearance below the battery pack 532 is further decreased by a few millimeters. The distance between a bottom surface of the shield 500 to the underbody 106 is a first height. A height of the slider bar 530 is greater than the first height, thereby ensuring that the slider bar 530 is present below the shield 500 and the battery pack 532, with respect to the lower surface 110 of the underbody 106. In the event the vehicle 100 bottoms out, the slider bar 530 makes contact with the road features (e.g., driveway ramps) instead of the battery pack 532 enclosed within the shield 500; thus ensuring the battery pack 532 is protected from scratches or scrapes from the ground and thereby.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
   a front axle;
   a rear axle;
   an underbody;
   a battery pack coupled to the underbody between the front axle and the rear axle; and
   a slider bar coupled to the underbody, the slider bar being closer to the ground than the battery pack,
   wherein the slider bar does not overlap the battery pack when viewed from a bottom view of the vehicle.

2. The vehicle of claim 1, further comprising a shield coupled to the underbody and covering the battery pack.

3. The vehicle of claim 2, wherein the shield includes a slot, the slider bar protruding through the shield through the slot.

4. The vehicle of claim 3, further comprising a plurality of tabs welded to the slider bar.

5. The vehicle of claim 4, wherein the tabs are coupled to the shield.

6. The vehicle of claim 5, wherein the tabs are sheet metal, the slider bar is steel, the shield is plastic, and the underbody includes sheet metal.

7. The vehicle of claim 1, wherein the slider bar includes:
   a first end coupled at least 50 cm away from the front axle and the rear axle; and
   a second end coupled at least 50 cm away from the front axle and the rear axle.

8. A vehicle, comprising:
   a front axle;
   a rear axle;
   an underbody;
   a battery pack coupled to the underbody between the front axle and the rear axle; and
   a slider bar including:
      a first end coupled to the underbody at least 30 cm away from the front axle and the rear axle;
      a second end coupled to the underbody at least 30 cm away from the front axle and the rear axle; and
      an intermediate portion between the first end and the second end and extending below the underbody lower than the battery pack,
      wherein the slider bar does not overlap the battery pack when viewed from a bottom view of the vehicle.

9. The vehicle of claim 8, wherein the first end and the second end are each coupled to the underbody at least 50 cm away from both the front axle and the rear axle.

10. The vehicle of claim 8, wherein the first end and the second end are bolted to the underbody.

11. The vehicle of claim 8, further comprising a bracket coupled to the underbody and the intermediate portion.

12. The vehicle of claim 8, wherein the intermediate portion is offset laterally from the battery pack.

13. The vehicle of claim 8, wherein the slider bar has a substantially rectangular cross section.

14. The vehicle of claim 8, wherein the slider bar has a substantially circular cross section.

15. The vehicle of claim 1, wherein an intermediate portion of the slider bar is disposed axially between a lateral edge of the battery pack and a centerline of the vehicle.

16. The vehicle of claim 15, wherein the intermediate portion extends between a first end and a second end of the slider bar, and further wherein the first end is coupled to the underbody at a first distance from the front axle and the second end is coupled to the underbody at a second distance from the rear axle.

17. The vehicle of claim 16, wherein the first distance is greater than the second distance.

18. The vehicle of claim 16, wherein the first end is coupled to the underbody at a first location that is a greater distance from the centerline of the vehicle than a second location at which the second end is coupled to the underbody.

19. A vehicle, comprising:
   a front axle;
   a rear axle;
   an underbody;
   a battery pack coupled to the underbody between the front axle and the rear axle; and
   a slider bar coupled to the underbody and including a first end, a second end, and an intermediate portion between the first end and the second end,
   wherein the first end is laterally offset a first distance from a central axis of the battery pack, the second end is laterally offset a second distance from the central axis, and the intermediate portion is laterally offset a third distance from the central axis,
   wherein the second distance is greater than the first distance, and the third distance is greater than the second distance such that the intermediate portion establishes a furthest feature of the slider bar from the central axis,
   wherein the slider bar does not overlap the battery pack when viewed from a bottom view of the vehicle.

* * * * *